US009154217B1

(12) United States Patent
Jain et al.

(10) Patent No.: US 9,154,217 B1
(45) Date of Patent: Oct. 6, 2015

(54) DIRECT CONVERSION REMOTE SATELLITE COMMUNICATIONS TERMINAL

(71) Applicant: ANOKIWAVE, INC., San Diego, CA (US)

(72) Inventors: Nitin Jain, San Diego, CA (US); David Corman, Phoenix, AZ (US)

(73) Assignee: ANOKIWAVE, INC., San Diego, CA (US)

( * ) Notice: Subject to any disclaimer, the term of this patent is extended or adjusted under 35 U.S.C. 154(b) by 0 days.

(21) Appl. No.: 14/066,634

(22) Filed: Oct. 29, 2013

(51) Int. Cl.
| H04B 1/40 | (2015.01) |
| H04W 84/12 | (2009.01) |
| H04W 88/06 | (2009.01) |
| H04B 7/185 | (2006.01) |
| H04W 88/16 | (2009.01) |
| H04W 92/00 | (2009.01) |
| H04B 7/155 | (2006.01) |
| H04B 1/38 | (2015.01) |

(52) U.S. Cl.
CPC .......... *H04B 7/1858* (2013.01); *H04B 7/18528* (2013.01); *H04B 7/18591* (2013.01); *H04B 7/18595* (2013.01); *H04B 1/38* (2013.01); *H04B 1/40* (2013.01); *H04B 7/155* (2013.01); *H04B 7/1851* (2013.01); *H04W 84/12* (2013.01)

(58) Field of Classification Search
CPC ...... H04B 1/30; H04B 1/405; H04B 7/18528; H04B 7/155; H04B 7/18591; H04B 7/18595; H04B 7/1858; H04B 1/38; H04B 1/40; H04H 40/90; H04N 21/6143; H04W 84/12
USPC .......... 375/324, 322, 316, 219, 222; 455/313, 455/323, 324, 333; 725/72, 68, 63
See application file for complete search history.

(56) References Cited

U.S. PATENT DOCUMENTS

| 5,373,265 | A | * | 12/1994 | Davis et al. ............... 332/151 |
| 5,815,809 | A | * | 9/1998 | Ward et al. ............... 455/428 |
| 5,835,057 | A | * | 11/1998 | van Heyningen ........... 342/359 |
| 6,029,052 | A | * | 2/2000 | Isberg et al. ............. 455/131 |
| 6,061,023 | A | * | 5/2000 | Daniel et al. .............. 342/354 |
| 2004/0043743 | A1 | * | 3/2004 | Rzyski et al. ............. 455/324 |
| 2004/0147269 | A1 | * | 7/2004 | Kim ...................... 455/456.2 |

(Continued)

OTHER PUBLICATIONS

European Space Agency, "Satellite Frequency Bands," Nov. 2013, European Space Agency, pp. 1-2, available at http://www.esa.int/Our_Activities/Telecommunications_Integrated_Applications/Satellite_frequency_bands, last accessed May 14, 2014.*

(Continued)

*Primary Examiner* — Chieh M Fan
*Assistant Examiner* — Michelle M Koeth
(74) *Attorney, Agent, or Firm* — Mintz Levin Cohn Ferris Glovsky and Popeo, P.C.

(57) ABSTRACT

Methods, apparatuses, computer program products, and computer readable media are disclosed herein. In one aspect, an apparatus can include a transmission line configured to accept a radio frequency signal from an antenna, wherein the antenna is configured to receive the radio frequency signal from a satellite. The apparatus can further include a system on a chip comprising a direct conversion receiver, a digital signal processor configured to process a digital representation of a baseband receive waveform to determine received information, and a wireless networking interface configured to send the received information to a satellite communications indoor unit.

15 Claims, 7 Drawing Sheets

(56) References Cited

U.S. PATENT DOCUMENTS

| | | | |
|---|---|---|---|
| 2006/0188037 A1* | 8/2006 | Yen et al. | 375/295 |
| 2007/0072603 A1* | 3/2007 | Wang | 455/427 |
| 2007/0255986 A1* | 11/2007 | Chang et al. | 714/724 |
| 2011/0215985 A1* | 9/2011 | Kaplan et al. | 343/879 |
| 2012/0077447 A1* | 3/2012 | Rofougaran | 455/73 |
| 2012/0313814 A1* | 12/2012 | Kojima | 342/201 |
| 2013/0149958 A1* | 6/2013 | Davis et al. | 455/12.1 |
| 2013/0235919 A1* | 9/2013 | Plevel | 375/226 |
| 2013/0279489 A1* | 10/2013 | Calcev et al. | 370/338 |
| 2014/0225769 A1* | 8/2014 | Akcasu et al. | 342/357.4 |

OTHER PUBLICATIONS

Huei Wang; Kun-You Lin; Zuo-Min Tsai; Liang-Hung Lu; Hsin-Chia Lu; Chi-Hsueh Wang; Jeng-Han Tsai; Tian-Wei Huang; Yi-Cheng Lin, "MMICs in the millimeter-wave regime," Microwave Magazine, IEEE , vol. 10, No. 1, pp. 99,117, Feb. 2009.*

Huei Wang; Kun-You Lin; Zuo-Min Tsai; Liang-Hung Lu; Hsin-Chia Lu; Chi-Hsueh Wang; Jeng-Han Tsai; Tian-Wei Huang; Yi-Cheng Lin, "MMICs in the millimeter-wave regime," Microwave Magazine, IEEE, vol. 10, No. I, pp. 99,117, Feb. 2009.*

European Space Agency, "Satellite Frequency Bands," Nov. 2013, European Space Agency, pp. 1-2, available at http://www.esa.int/~ur-Activities/Te~ec~mmunicati~ns~ntegrated-App~icati~ns/Sate~~ite-frequency-bands~ last accessed May 14, 2014.*

Jorn Christensen, "ITU Regulations for Ka-band Satellite Networks," presented at ITU Prospects for use of Ka-band by satellite communications meeting, Almaty, Kazakhstan, Sep. 5-7, 2012, pp. 1-16. https://www.itu.int/md/dologin_md.asp?lang=en&id=R12-ITURKA.BAND-C-0001!!PDF-E, Last Accessed: Feb. 13, 2015.*

* cited by examiner

DIRECT CONVERSION REMOTE SATELLITE COMMUNICATIONS TERMINAL

TECHNICAL FIELD

The subject matter described herein relates to satellite communications and in particular a direct conversion satellite communications terminal that is remote from a data source/sink.

BACKGROUND

Satellite communications (SATCOM) transceivers typically employ a superheterodyne architecture. The over-the-air frequencies of typical satellite communications include Ku-band, Ka-band, and other frequencies. Common intermediate (IF) frequencies in satellite communications superheterodyne transceivers include 0.95 GHz-1.45 GHz and other frequencies. The cost of components at these frequencies and the complexity of superheterodyne transceivers cause the cost to be high of user terminals such as satellite television transceivers and satellite based Internet service equipment.

SUMMARY

Methods, apparatuses, computer program products, and computer readable media are disclosed herein. In one aspect, an apparatus includes a transmission line configured to accept a radio frequency signal from an antenna, wherein the antenna is configured to receive the radio frequency signal from a satellite. The apparatus further includes a system on a chip comprising a direct conversion receiver, a digital signal processor configured to process a digital representation of a baseband receive waveform to determine received information, and a wireless networking interface configured to send the received information to a satellite communications indoor unit.

In some embodiments, the transmission line is further configured to provide another radio frequency signal to the antenna, the antenna is further configured to send the other radio frequency signal to the satellite, the system on a chip further comprises a direct conversion transmitter, the digital signal processor is further configured to process transmit information to provide a digital representation of a baseband transmit waveform, and/or the wireless networking interface is further configured to receive the transmit information from the satellite communications indoor unit.

In some embodiments the satellite communications indoor unit is configured to send the received information to a data sink and to receive the transmit information from a data source. In some embodiments, the direct conversion transmitter is configured to up-convert the baseband transmit waveform in one up-conversion and the direct conversion receiver is configured to down-convert the receive waveform to baseband in one down-conversion, the baseband transmit waveform and the baseband receive waveform have center frequencies below the antenna transmit and receive frequencies (e.g., baseband frequencies between 100 MHz and 1500 MHz, although other frequencies can be used as well), and/or the wireless networking interface is configured to comply with one or more standards including WiFi, WiMax, Bluetooth, ZigBee, HiperLAN, and 2G/3G/4G cellular standards, and/or the antenna is a phased array antenna.

In some embodiments, the digital signal processor is further configured to digitally perform quadrature modulation of the baseband transmit waveform, and to digitally perform quadrature demodulation of the baseband receive waveform.

In some embodiments, the apparatus is further configured to directly send, by bypassing the satellite communications indoor unit, the receive information to a data sink and to receive the transmit information from a data source.

Computer program products are also described that comprise non-transitory computer readable media storing instructions, which when executed by one or more processors causes at least one processor to perform at least some of the operations disclosed herein. At least one memory may be coupled to the one or more data processors. The at least one memory may temporarily or permanently store instructions that cause at least one processor to perform the one or more of the operations.

The subject matter described herein provides many advantages. For example, the current subject matter provides for a low-cost fixed SATCOM terminal and a low-cost mobile SATCOM terminal by simplifying the fixed/mobile terminal electronics. Moreover, installation of the fixed/mobile terminal is made easier and less costly by using electronically steerable, low-cost antennas. Fixed/mobile SATCOM terminal performance is enhanced due at least in part to the direct conversion disclosed herein which reduces or eliminates the spurious emissions of a superheterodyne transceiver and the susceptibility to radiated emissions in the intermediate frequency band(s) of the superheterodyne transceiver. Direct conversion provides at least the following advantages: 1) minimizes the amount of hardware in the SATCOM outdoor unit due to elimination of intermediate frequency filters, and elimination of a second local oscillator; 2) allows the interface between the SATCOM outdoor unit and the SATCOM indoor unit to be at baseband or carried by a wireless network rather than at an intermediate frequency; and 3) allows the up/down conversion to be realized on a single system on a chip (SoC) without off-chip filters being required.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Some implementations of the instant subject matter are fully monolithic solid-state implementations for a direct conversion satellite communications (SATCOM) terminal. Some implementations overcome complex frequency plans often used in conventional earth station and mobile terminals. These complex frequency plans employ a large number of filters. The direct conversion disclosed herein minimizes expensive radio frequency hardware by eliminating the complex frequency plans of superheterodyne transmitters and receivers. The direct conversion transmitter and receiver disclosed herein convert the radio frequency signals to and from a satellite to baseband in a single frequency conversion. A complete transceiver can be implemented as a system on a chip (SoC) with no off-chip filters being required.

In some implementations, a satellite transceiver and antenna are installed outdoors such as on the roof of a building. This outdoor equipment is sometimes referred to as an "outdoor unit," or ODU. The outdoor unit may communicate with an "indoor unit," or IDU, where the outdoor unit and indoor unit together provide some type of satellite data communications service such as satellite based television or satellite based Internet service. Other services may also be provided. In some implementations, the outdoor unit may communicate with the indoor unit using a wireless network such as WiFi, WiMax, or other wireless standard. A wireless connection between the outdoor and indoor units greatly reduces the difficulty of installation and the associated costs because no hard wiring is required between the units. For example, this would allow an unskilled homeowner to install the system. In some implementations, the outdoor unit may communicate with the indoor using an Ethernet interface or other wired standard. In some implementations, the outdoor unit may communicate with the indoor unit using a low intermediate frequency. Other interfaces or additional interfaces can also be used. In some implementations, the outdoor unit can communicate directly with a data source/sink such as a computer providing a user with Internet access or satellite television without the need for an indoor unit. In these implementations, the outdoor unit may communicate with the data source/sink directly using the wired networking, wireless networking, or other interface available at the outdoor unit.

Figure 1:
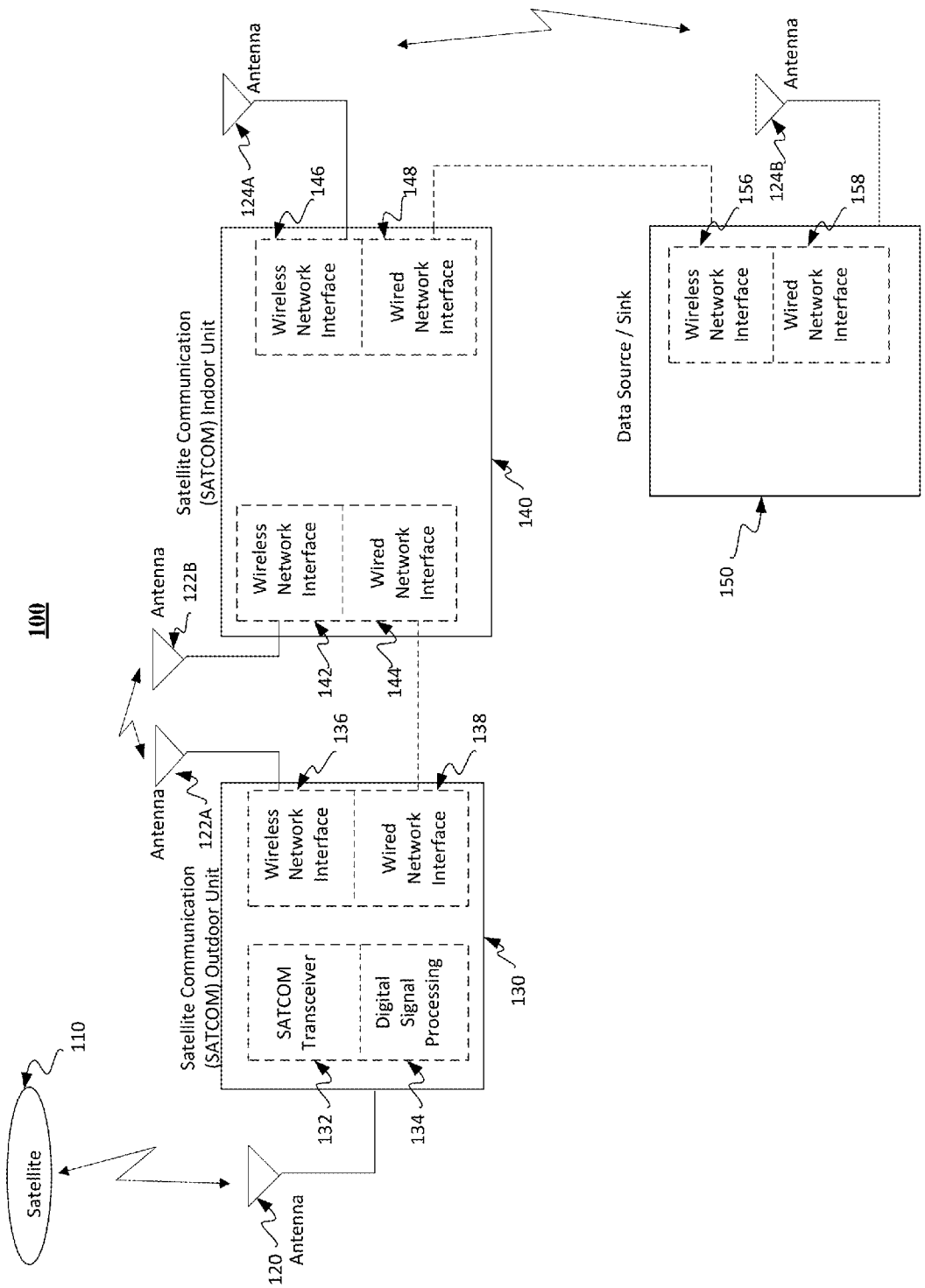
FIG. 1 depicts an example satellite communications system, in accordance with some implementations.

FIG. 1 depicts an example satellite communications system, in accordance with some implementations. Satellite 110 may support data services such as Internet services, satellite television services, and/or voice services. Satellite 110 may operate at frequencies including X-band, Ku-band, K-band, Ka-band, Q-band, W-band, and/or other frequencies. Satellite 110 communicates over-the-air with SATCOM ODU 130 through antenna 120. SATCOM ODU 130 communicates with SATCOM IDU 140 via wired interface 138 or wireless interface 136. SATCOM IDU 140 communicates with data source/sink 150 via wired interface 148 or wireless network interface 146. Satellite 110, SATCOM ODU 130, and SATCOM IDU 140 provide data communication services to data sink/source 150. Those services may include internet services, data services, satellite television services, and/or voice services.

Signals from satellite 110 are received at antenna 120 and signals to satellite 110 are sent from antenna 120. In order to communicate with satellite 110 using low power, antenna 120 may be high-gain. Antenna 120 may be any type of suitable antenna such as a dish antenna or other reflector-based antenna, mechanically steered patch array antennas, phased array antennas, and so on. SATCOM ODU 130 may be co-located with antenna 120 to reduce the electrical losses proportional to the length of transmission lines connecting SATCOM ODU 130 to antenna 120.

SATCOM ODU 130 includes SATCOM transceiver 132, digital signal processing 134, wireless network interface 136, and wired network interface 138. SATCOM transceiver 132 includes a SATCOM transmitter and a SATCOM receiver. SATCOM transceiver 132 may include passive devices, active devices, and circuits including local oscillators, mixers, filters, isolators, transmission lines, inductors, capacitors, transistors, FETs, and so on. The SATCOM transceiver may perform direct up-conversion, up-conversion from a low intermediate frequency (IF), direct down-conversion, and/or down-conversion from a low intermediate frequency. SATCOM transceiver 132 can perform some portion of modulation and/or demodulation of the signal and digital signal processor 134 can perform some portion or all of the signal modulation and demodulation. Digital signal processor 134 may perform encoding and/or decoding of digital data to provide error-correction, error detection, and/or to conform to various communications standards and/or protocols. For example, a digital satellite television system is implemented using the protocols, encoding/decoding, and data processing for that system. This signal and data processing may be performed in the combination of the SATCOM transceiver 132 and digital signal processor 134.

SATCOM ODU 130 may include one or more of a wireless network interface 136 and a wired network interface 138. Wireless network interface 136 may communicate via antenna 122A to SATCOM IDU 140 via antenna 122B of wireless network interface 142. Wired network interface 138 may communicate to SATCOM IDU 140 via a cable connecting wired network interface 138 to wired network interface 144. These interfaces can provide data communication between SATCOM ODU 130 and SATCOM IDU 140. The data communicated may include payload data and/or control data. For example, payload data may include digital satellite television data and/or an Internet data. Control data may include, for example, channel selection information, SATCOM transceiver control data, and/or digital signal processor control data. Wireless networking interface 136 may include WiFi (IEEE 802.11 family of standards), WiMax (IEEE 802.16 family of standards), ZigBee (IEEE 802.15 family of standards), HiperLAN, 2G/3G/4G cellular standard, or any other wireless standard. Wired interface 138 may include 10/100/1000 Ethernet or any other wired network interface.

SATCOM IDU 140 may include a wired interface 144 similar to wired network interface 138 and/or wireless interface 142 similar to wireless network interface 136. SATCOM ODU 130 communicates with SATCOM IDU 140 over one or more of interfaces between 136 and 142, and between 138 and 144. SATCOM IDU 140 may further include additional interfaces 146 and/or 148 to send/receive data to/from data source/sink 150. In some implementations, data source/sink 150 may communicate directly with SATCOM ODU 130 without requiring SATCOM IDU 140. In these implementations, wireless network interface 156 or wired network interface 158 may communicate with wireless network interface 136 or wired network interface 138 interface, respectively. Data source/sink 150 may include a satellite television display or monitor, a computer, or other source/sink of data.

Figure 2:
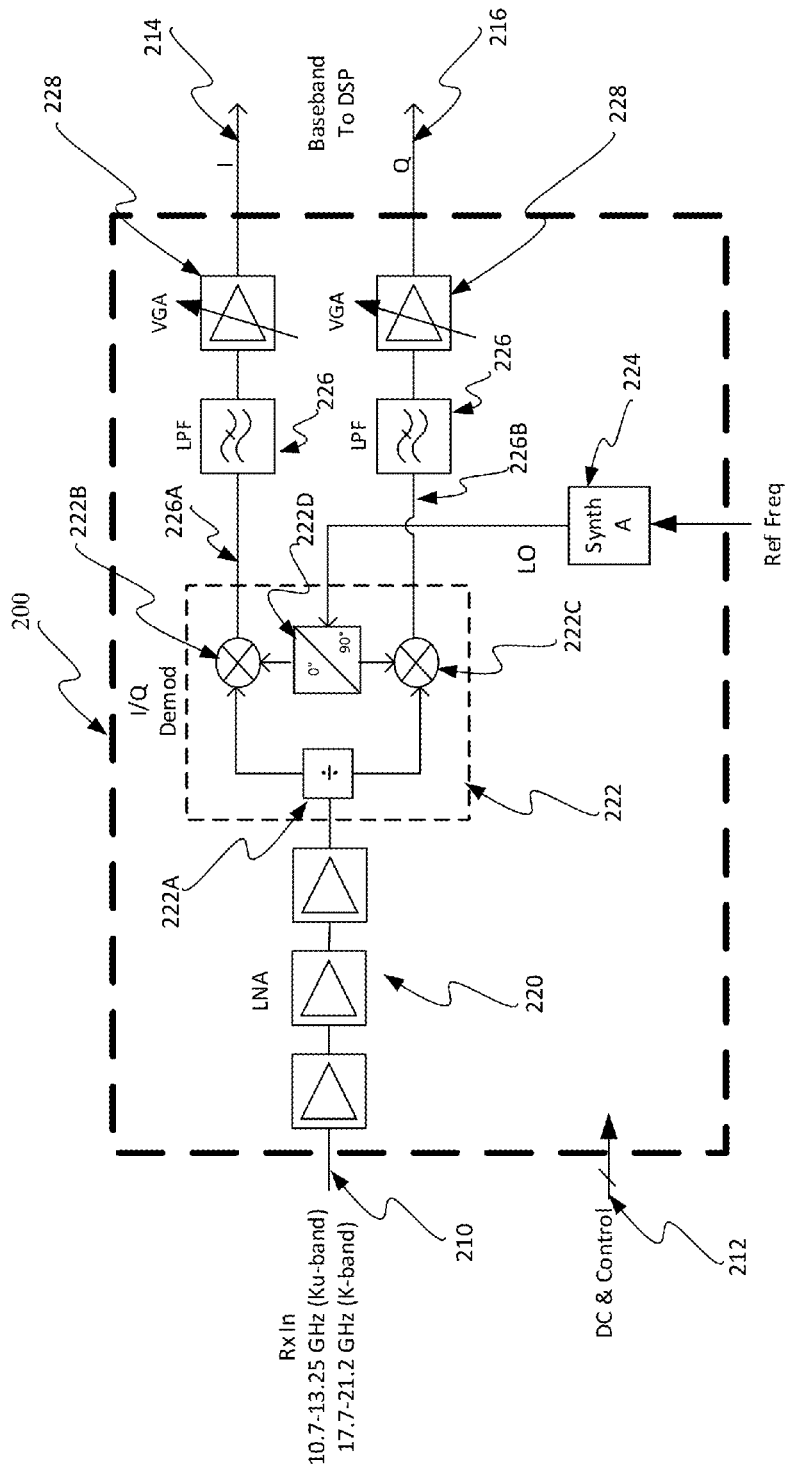
FIG. 2 depicts an example of a direct conversion SATCOM receiver, in accordance with some implementations.

FIG. 2 depicts an example of a direct conversion satellite communications receiver 200, in accordance with some implementations. SATCOM receiver 200 takes radio frequency signal 210 and produces in-phase baseband signal 214 and quadrature baseband signal 216. Receiver 200 includes one or more low-noise amplifiers 220, demodulator 222, filters 226, frequency synthesizer 224, and variable gain amplifiers 228. Power and control signals are provided to the receiver 200 at 212.

At 220, low-noise amplifier(s) 220 take(s) radio frequency input signal 210 and amplifies the signal in order to further process the signal. Low noise amplifier(s) 220 may include any number of stages, the number of stages dependent on the selected low-noise amplifiers in the chain and a predetermined processing signal level. For example, a Ku-band radio frequency signal at frequencies including 10.7 GHz to 13.25 GHz and/or a K-band radio frequency signal at frequencies including 17.7 GHz to 21.2 GHz may be provided to receiver 200. In some implementations, three low-noise amplifier stages may be used as shown in FIG. 2 at 220.

At 222, the amplified signal from the low-noise amplifier(s) 220 is passed to in-phase and quadrature (I/Q) demodulator 222. I/Q demodulator 222 includes radio frequency power divider 222A, mixers 222B and 222C, and quadrature phase splitter 222D operating on a synthesized radio frequency signal from synthesizer 224. Quadrature phase splitter 222D produces an in-phase version of the signal from synthesizer 224 for mixer 222B, and a version of the signal from synthesizer 224 that is shifted by 90 degrees for mixer 222C.

Synthesizer 224 produces a radio frequency signal whose frequency is equal to or very nearly equal to the input signal 210. Very nearly equal to signal 210 means a signal with a frequency that when mixed with the input signal 310 results in an intermediate frequency that is sufficiently low that it can be digitally sampled with an analog-to-digital converter. The frequency of synthesizer 224 may be chosen so that the resulting signals 226A and 226B require no further down conversion and can be demodulated and detected to produce the received data. Signals 226A and 226B are said to be at baseband or some other low intermediate frequency.

At 226, signals 226A and 226B pass through low-pass filters 226. Low pass filters 226 may include inductor-capacitor (LC) filters, surface-acoustic wave (SAW) filters, or filters made from any other types of components. In some implementations, low-pass filters 226 may be implemented digitally in executable code stored on a non-transitory computer-readable medium. Low pass-filters may also be implemented in programmable logic such as programmable logic devices (PLDs), field-programmable gate arrays (FPGAs), and so on.

At 228, variable gain amplifiers 228 amplify the signals from low-pass filters 226 to a desired level. In some implementations, analog filters (LC, SAW, etc.) produce a signal that may need some amplification to produce a desired signal level. The desired signal level may correspond to an analog-to-digital converter voltage range. In some implementations, low-pass filters 226 may be implemented digitally (PLD, FPGA, executable code, etc.). In these implementations, variable gain amplifiers 228 may include digital short registers to amplify the signal. In some implementations, variable gain amplifiers 228 may be implemented in hardware. The outputs of variable gain amplifiers 228 may be baseband in-phase signal 214 and quadrature signal 216.

Figure 3:
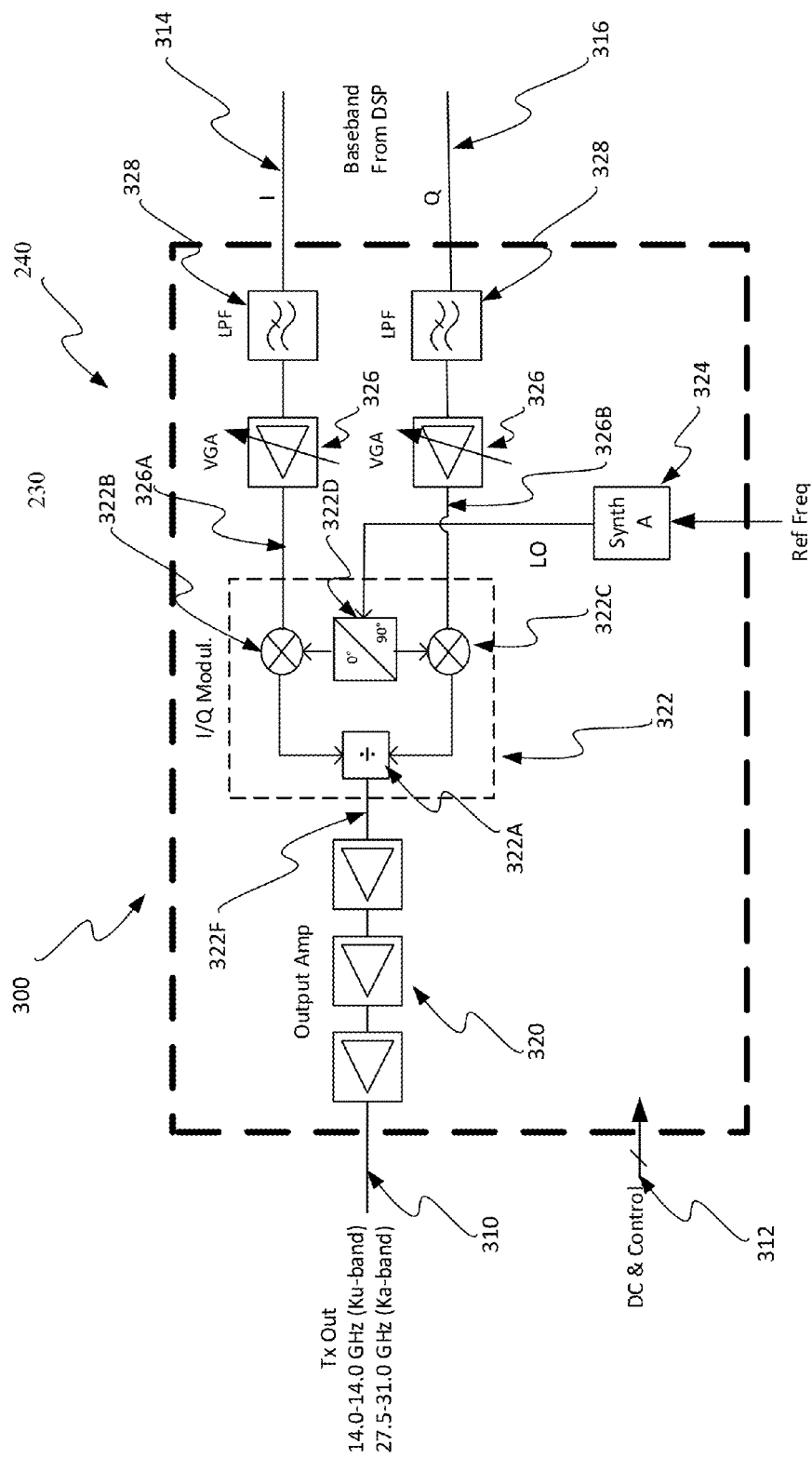
FIG. 3 depicts an example of a direct conversion SATCOM transmitter, in accordance with some implementations.

FIG. 3 depicts an example of a direct conversion SATCOM transmitter 300, in accordance with some implementations. SATCOM transmitter 300 produces radio frequency signal 310 from in-phase baseband signal 314 and quadrature baseband signal 316. Transmitter 300 includes one or more power amplifiers 320, modulator 322, filters 328, frequency synthesizer 324, and variable gain amplifiers 326. Power and control signals are provided to the transmitter 300 at 312.

Power amplifier(s) 320 amplify(ies) the radio frequency output from quadrature modulator 322 in order to provide a predetermined output power. Power amplifier(s) 320 may include any number of stages, the number of stages dependent on the selected power amplifiers for the chain and the predetermined output power. For example, an output may be a Ku-band radio frequency signal at frequencies including a 14.0 GHz and/or a Ka-band radio frequency signal at frequencies including 27.5 GHz to 31 GHz may be provided by transmitter 300. In some implementations, three power amplifier stages may be used as shown in FIG. 3 at 320.

At 322, I/Q modulator 322 produces a modulated signal to provide to power amplifier(s) 320. I/Q modulator 322 includes radio frequency power combiner 322A, mixers 322B and 322C, and quadrature phase splitter 322D operating on a synthesized radio frequency signal from synthesizer 324. Quadrature phase splitter 322D produces an in-phase version of the signal from synthesizer 324 for mixer 322B and a quadrature version of the signal from synthesizer 324 that is shifted by 90 degrees for mixer 322C.

Synthesizer 324 produces a radio frequency signal whose frequency is equal to or very nearly equal to the output signal 310. Very nearly equal to signal 310 means a signal with a frequency that is sufficiently close to the output signal 310 such that the intermediate frequency is low enough to be digitally created with a digital-to-analog converter. The frequency of synthesizer 324 may be chosen so that the resulting signal 322F requires no further up-conversion. Signals 326A and 326B are at baseband or some other low intermediate frequency.

At 326, variable gain amplifiers 326 amplify the signals from low-pass filters 328 to a predetermined level. In some implementations, analog filters (LC, SAW, etc.) produce signals that may need amplification to produce the predetermined signal level. The predetermined signal level may correspond to a predetermined transmit power level 310. In some implementations, low-pass filters 328 may be implemented digitally (PLD, FPGA, executable code, etc.). In these implementations, variable gain amplifiers 326 may be implemented digitally. In some implementations, variable gain amplifiers 326 may be implemented in hardware.

At 328, in-phase signal 314 and quadrature signal 316 pass through low-pass filters 328. These signals may be at baseband or some other low intermediate frequency. Low pass filters 328 may include inductor-capacitor (LC) filters, surface-acoustic wave (SAW) filters, or filters made from any other components. In some implementations, low-pass filters 328 may be implemented digitally in executable code stored on a non-transitory computer-readable medium. Low pass-filters may also be implemented in programmable logic such as programmable logic devices (PLDs), field-programmable gate arrays (FPGAs), and so on.

Figure 4:
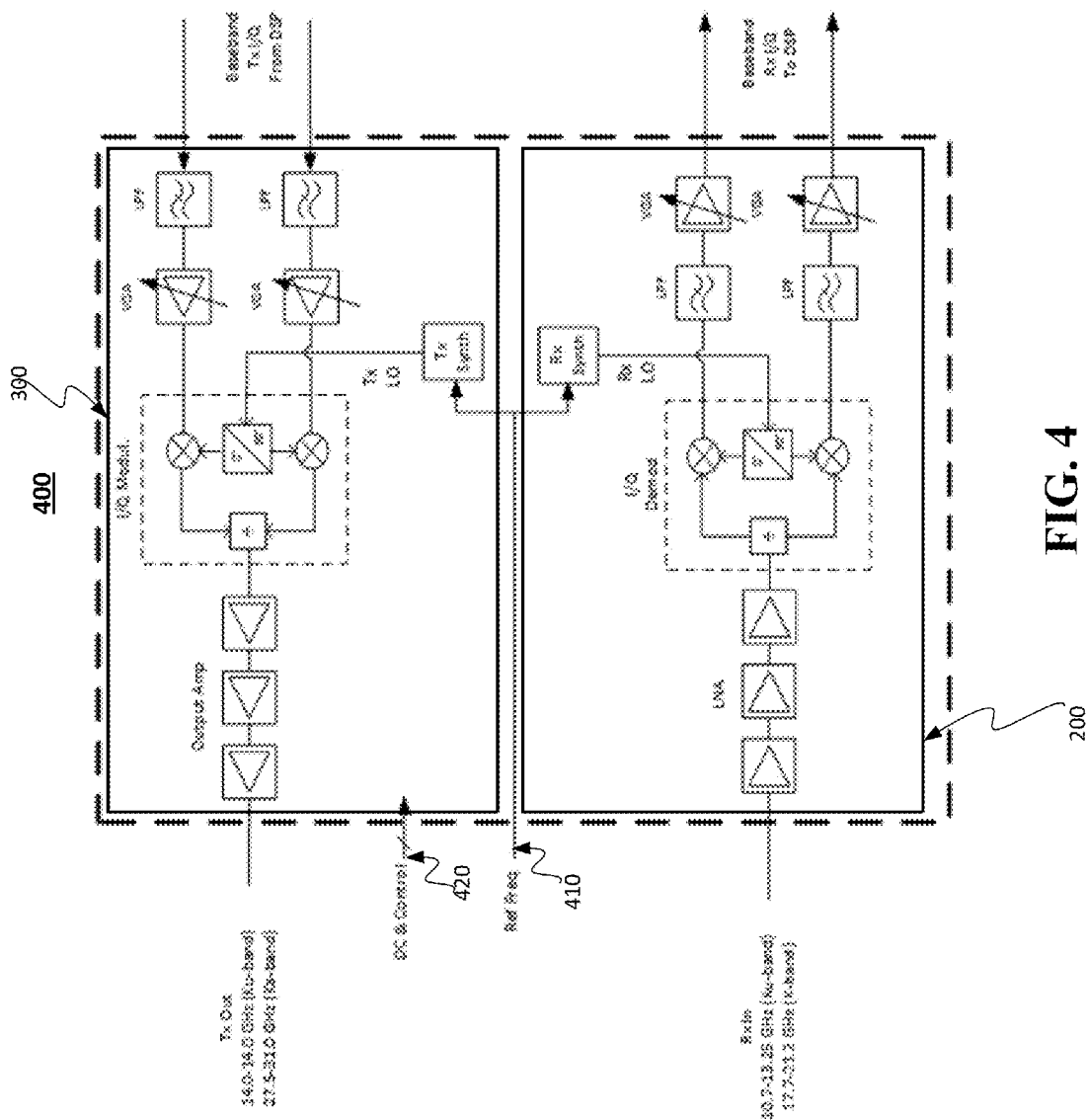
FIG. 4 an example of a direct conversion SATCOM transceiver, in accordance with some implementations.

FIG. 4 depicts an example of a direct conversion SATCOM transceiver, in accordance with some implementations. In some implementations, transceiver 400 includes a receiver consistent with receiver 200 and a transmitter consistent with transmitter 300. Instead of the separate reference frequencies provided to synthesizer 224 in 200 and synthesizer 324 in 300, a common reference frequency 410 can be shared by both receiver 200 and transmitter 300. Likewise, a single power and control interface 420 can be shared by receiver 200 and transmitter 300 instead of the separate interfaces 212 and 312.

Figure 5:
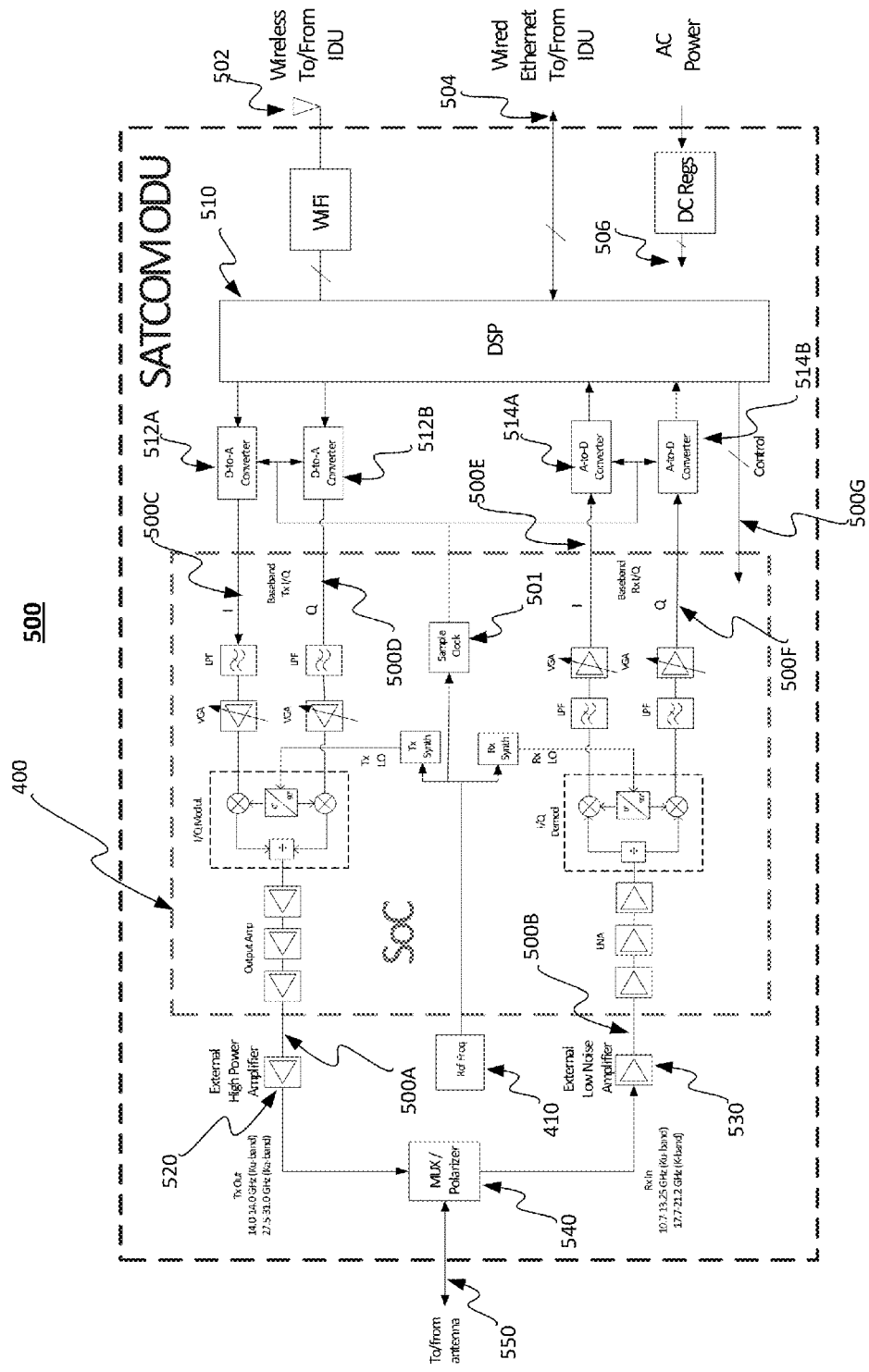
FIG. 5 depicts an example satellite communications outdoor unit using direct conversion and analog modulation/demodulation, in accordance with some implementations.

FIG. 5 depicts an example satellite communications outdoor unit 500 (SATCOM ODU) using direct conversion, in accordance with some implementations. SATCOM ODU 500 is an example implementation of SATCOM ODU 130 in FIG. 1.

SATCOM ODU 500 may include transceiver 400 implemented as a system on a chip (SoC). Transceiver 400 can provide transmitter output 500A and receiver input 500B. Baseband I/Q transmit signals 500C and 500D provided to transceiver 400 can be provided by digital-to-analog converters (DACs) 512A and 512B. Transceiver 400 can provide baseband I/Q receive signals 500E and 500F to analog-todigital converters (ADCs) 514A and 514B. Transceiver 400 control may be provided using control interface 500G. Power 506 is distributed throughout ODU 500. Transmit signal 500A from transceiver 400 can be provided to external power amplifier 520 to further increase the transmitted power. MUX/polarizer 540 may separate combined signal 550 into a receive signal from the antenna and a transmit signal to the antenna. The receive signal is routed to low-noise amplifier 530 and the transmit signal is routed from power amplifier 520. The amplified signal can be fed through MUX/polarizer 540 to provide combined transmit/receive signal 550. MUX-polarizer 540 provides the receive signal to low-noise amplifier 530 from combined transmit/receive signal 550. In some implementations, MUX/polarizer 540 may separate the transmit and receive signals using a transmit/receive switch. In some implementations, for example implementations that use time division duplexing, MUX/polarizer 540 may include a transmit/receive (T/R) switch to separate the transmit signal from power amplifier 520 from the receive signal to low-noise amplifier 530. In some implementations, the transmit and receive signals are separated at the antenna based on polarization of the radiated emissions sent and received by the antenna. In some implementations, for example implementations that use frequency division duplexing, MUX/polarizer 540 may include a diplexer to separate the transmit signal (from power amplifier 520) from the receive signal (to low-noise amplifier 530).

Digital signal processor 510 can generate digital representations of in-phase transmit signal 500C and quadrature transmit signal 500D using executable code implementing digital signal processing techniques. For example, a digital representation of a binary phase shift keying (BPSK) modulated waveform can be generated by digital signal processor 510. The I/Q digital representation can be transformed into voltages (or currents) 500C and 500D by DACs 512A and 512B. I/Q receive voltages (or currents) 500E and 500F are transformed into digital representations by ADCs 514A and 514B. Digital signal processor 510 may perform receive signal processing on the digital representations including signal detection, error detection of the detected signal, and error correction. Digital signal processor 510 may perform transmit signal processing including, error detection encoding, and error correction encoding, and modulation. Other signal processing may also be performed by digital signal processor 510.

Digital signal processor 510 takes digital representations of I/Q baseband signals 500E and 500F and determines an estimate of the data transmitted from satellite 110 (received data). Digital signal processor 510 also produces digital representations of I/Q baseband signals 500C and 500D to be transmitted to satellite 110 (transmitted data). The received digital data can be provided to SATCOM IDU 140 via a WiFi wireless network interface 502, or wired Ethernet interface 504. The transmitted digital data can be provided from the SATCOM IDU 140 to the SATCOM ODU via WiFi wireless network interface 502 or wired Ethernet interface 504. A wireless connection between the outdoor and indoor units greatly reduces the difficulty of installation and the associated costs because no hard wiring is required between the units. For example, this would allow an unskilled homeowner to install the system.

Figure 6:
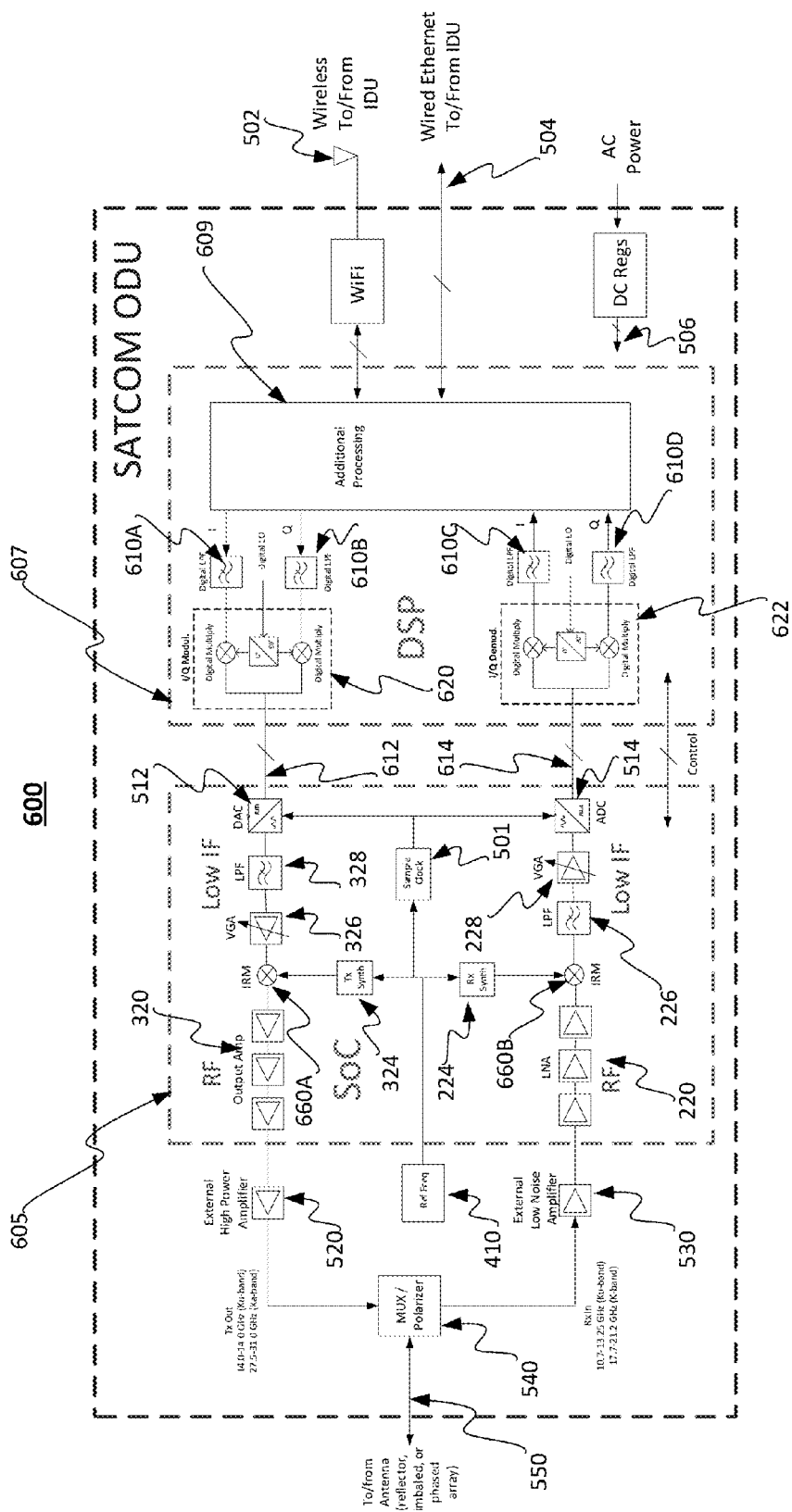
FIG. 6 depicts an example satellite communications outdoor unit using a low intermediate frequency and digital modulation/demodulation, in accordance with some implementations.

FIG. 6 depicts an example satellite communications outdoor unit 600 using a low intermediate frequency, in accordance with some implementations. Low intermediate frequency means a frequency that is sufficiently low to allow analog-to-digital conversion and digital-to-analog conversion. SATCOM ODU 600 includes digital signal processing 607, radio frequency system on a chip 605, wireless network interface 502, wired network interface 504, power 506, power amplifier 520, low-noise amplifier 530, reference frequency 410, and MUX/polarizer 540. System on chip 605 may have low intermediate frequencies that can be digitized by DAC 512 and ADC 514 without aliasing. Digital signal processing 607 can include digital filters, digital modulator, and digital demodulator, as well as other signal processing.

DAC 512 in RF SoC 605 transforms digital representation 612 of the modulated low IF transmit signal to a voltage (or current). The DAC output is filtered by low-pass filter 328, amplified by VGA 326, up-converted by image reject mixer (IRM) 660A, and amplified by power amplifier 320. RF SoC accepts the RF signal from low-noise amplifier 530, further amplifies the signal at 220, down-converts the signal with IRM 660B, filters the down-converted signal at 226, amplifies the signal at VGA 228, and provides the resulting output to ADC 514 that produces a digital representation 614 of the voltage (or current).

At 607, digital signal processing 607 includes digital low-pass filtering 610A-D, digital modulator 620, and digital demodulator 622. Additional processing 609 can also be performed and can include error correction encoding/decoding, error detection encoding/decoding, as well as protocol processing. Other aspects of FIG. 6 are also described in FIGS. 1-5 at reference numbers with the same values as used in FIG. 6.

Figure 7:
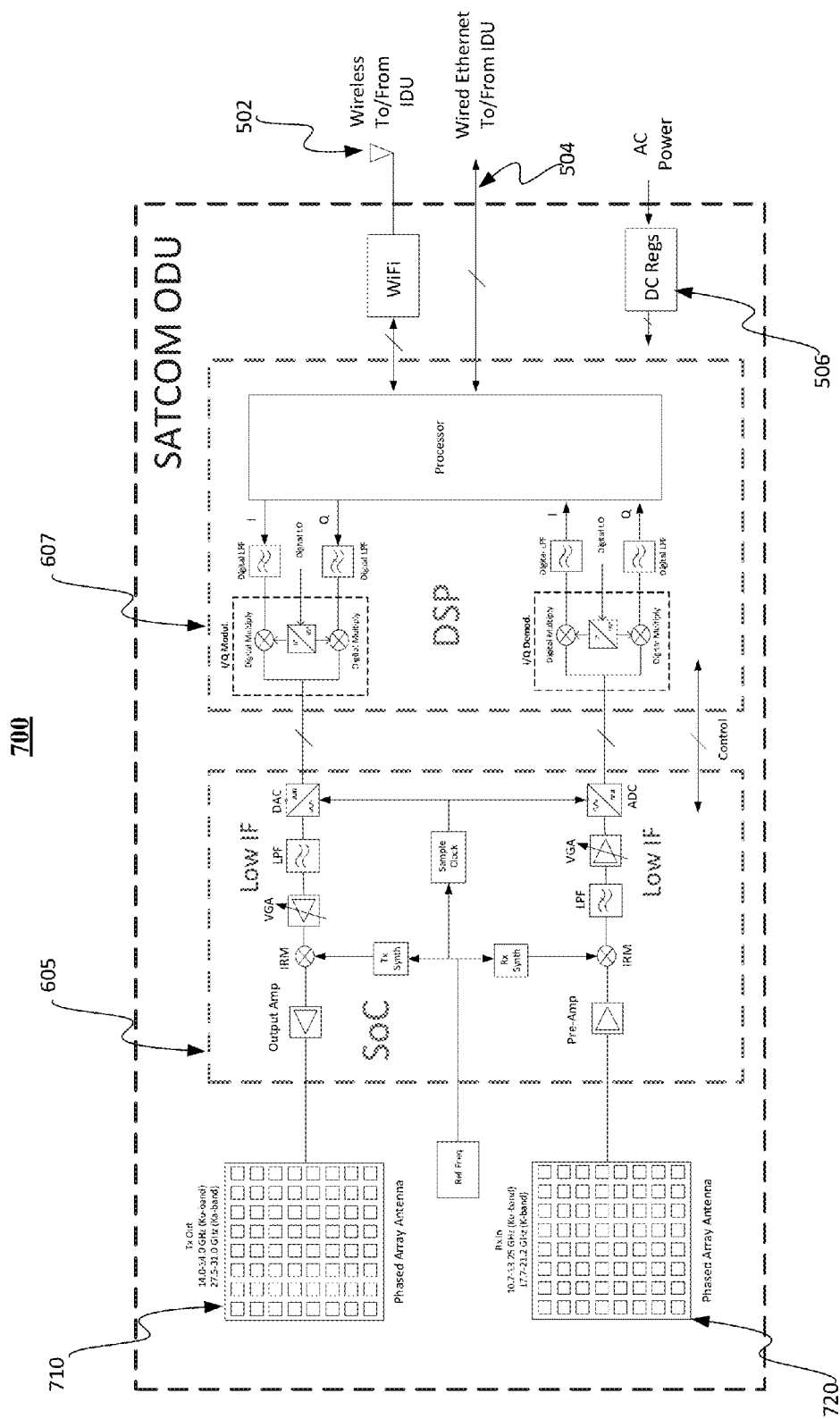
FIG. 7 depicts an example satellite communications outdoor unit with a low intermediate frequency, phased array antenna, and digital modulation/demodulation, in accordance with some implementations.

FIG. 7 depicts an example satellite communications outdoor unit 700 with a low intermediate frequency and phased array antenna, in accordance with some implementations. Low intermediate frequency means a frequency that is sufficiently low to allow analog-to-digital conversion and digital-to-analog conversion. SATCOM ODU 700 includes system on a chip 605, digital signal processing 607, wireless network interface 502, wired network interface 504 and control 506 similar to FIG. 6. A wireless connection between the outdoor and indoor units greatly reduces the difficulty of installation and the associated costs because no hard wiring is required between the units. For example, this would allow an unskilled homeowner to install the system. SATCOM ODU 700 also includes phased array antennas 710 and 720.

Transmit phased array antenna (PAA) 710 may be configured to electronically steer the direction of one or more beams radiated from 710. For example, PAA 710 may be configured to synthesize one beam and to steer the beam to 30 degrees in azimuth and 20 degrees in elevation from boresight. Boresight corresponds to a direction that is normal to the surface of PAA 710. The beam can be steered to other angles dependent on the design of the PAA and control signals provided to the PAA containing pointing information. Receive phased array antenna (PAA) 720 may be configured to electronically steer the direction of one or more beams of 720. For example, PAA 720 may be configured to synthesize one beam and to steer the beam to 10 degrees in azimuth and 15 degrees in elevation from boresight. In some implementations, transmit PAA 710 and receive PAA 720 are integrated in to a single transmit/receive PAA.

PAAs 710 and 720 enable adjustment of the direction of the transmit and receive beams. This adjustability enables digital signal processor 607 to align the ODU antenna beams generated by PAAs 710, 720 with the signals to/from satellite 110. Electronic alignment reduces the importance of manually aligning the antennas during installation, this reducing the time required for the initial SATCOM ODU installation. Electronic beam alignment reduces the initial installation costs as well as maintenance costs. For example, the SATCOM ODU may be installed by unskilled homeowner.

In some implementations, a global positioning system (GPS) receiver is included in SATCOM ODU 700 (not shown in FIG. 7). Adding GPS allows determination of the position of the SATCOM ODU and thus the direction in which the beams need to be steered in order to communicate with satellite 110. Including GPS allows the continuous update of beam direction for SATCOM ODUs that are moving. In this way, any distant satellite whose position is fixed or predictable (GEO, MEO, LEO satellites for example) may be tracked by the PAAs. The SATCOM ODU can determine the required beam direction and steer the beam in that direction based on its own GPS location and satellite ephemeris.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. An apparatus configured as a satellite communications outdoor unit, the apparatus comprising:
   a receive antenna to receive a first radio frequency signal from a satellite, wherein a receive beam produced by the receive antenna is electrically steerable to point to the satellite;
   a transmit antenna to transmit a second radio frequency signal to the satellite, wherein a transmit beam produced by the transmit antenna is electrically steerable to point to the satellite;
   a system on a chip comprising:
      a satellite communications receiver to down-convert the first radio frequency signal from the receive antenna to a baseband receive signal in one down-conversion operation, the satellite communications receiver comprising:
         a demodulator; and
         a first frequency synthesizer producing a first input signal to the demodulator at a first frequency at or near the first radio frequency signal from the satellite; and
      a satellite communications transmitter to generate the second radio frequency signal to the transmit antenna by up-converting a baseband transmit signal to the second radio frequency signal in one up-conversion operation, the satellite communications transmitter comprising:
         a modulator; and
         a second frequency synthesizer producing a second input signal to the modulator at a second frequency at or near the second radio frequency signal;
   a global positioning system receiver to determine a world position of the apparatus, wherein the global positioning system receiver occasionally updates the world position of the apparatus;
   a digital signal processor to process a first digital representation of the baseband receive signal to determine received information, and to process transmit information to determine a second digital representation of the baseband transmit signal to the satellite communications transmitter, wherein the digital signal processor causes both the receive antenna and the transmit antenna to point to the satellite, based on the world position of the apparatus determined by the global positioning receiver and a fixed or predictable position of the satellite; and
   a wireless network interface to directly send the received information to a data sink and to directly receive the transmit information from a data source.

2. The apparatus as in claim 1, wherein the baseband transmit signal and the baseband receive signal have center frequencies between 100 MHz and 1500 MHz.

3. The apparatus as in claim 1, wherein the receive antenna is a phased array antenna.

4. The apparatus as in claim 1, wherein the digital signal processor is further configured to digitally perform quadrature modulation of the baseband transmit signal and to digitally perform quadrature demodulation of the baseband receive signal.

5. A method for implementation by a satellite communications outdoor unit, the method comprising:
   receiving, at a receive antenna, a first radio frequency signal from a satellite, wherein the receive antenna is electrically steerable to point a first phased array antenna capable of pointing to the satellite;

transmitting, from a transmit antenna, a second radio frequency signal to the satellite, wherein the transmit antenna is a second phased array antenna capable of pointing to the satellite;

down-converting, in one down-conversion operation at a system on a chip comprising a satellite communications receiver, the first radio frequency signal to a baseband receive signal, wherein the satellite communications receiver comprises a demodulator, and a first frequency synthesizer producing a first input signal to the demodulator at a first frequency at or near the first radio frequency signal from the satellite;

up-converting, in one up-conversion operation at the system on a chip further comprising a satellite communications transmitter, a baseband transmit signal to the second radio frequency signal, wherein the satellite communications transmitter comprises a modulator, and a second frequency synthesizer producing a second input signal to the modulator at a second frequency at or near the second radio frequency signal;

determining, by a global positioning system receiver, a world position of the apparatus, wherein the global positioning system receiver occasionally updates the world position of the apparatus;

processing, by a digital signal processor, a first digital representation of the baseband receive signal to determine received information, and processing transmit information to determine a second digital representation of the baseband transmit signal to the satellite communications transmitter, wherein the digital signal processor causes both the receive antenna and the transmit antenna to point to the satellite, based on the world position of the receive antenna and/or the transmit antenna determined by the global positioning receiver and a fixed or predictable position of the satellite; and sending, by a wireless networking interface, the received information directly to a data sink, and receiving the transmit information directly from a data source.

6. The method as in claim 5, wherein the baseband transmit signal and the baseband receive signal have center frequencies between 100 MHz and 1500 MHz.

7. The method as in claim 5, wherein the digital signal processor is further configured to digitally perform quadrature modulation of the baseband transmit signal and to digitally perform quadrature demodulation of the baseband receive signal.

8. The apparatus as in claim 1, wherein the first radio frequency signal lies between 10.7 GHz and 13.25 GHz, and wherein the second radio frequency signal is within a frequency band including 14 GHz.

9. The method as in claim 5, wherein the radio frequency signal lies between 10.7 GHz and 13.25 GHz, or 17.7 GHz and 21.2 GHz, and wherein the other radio frequency signal is within a frequency band including 14 GHz, or between 27.5 GHz and 31.0 GHz.

10. The apparatus as in claim 1, wherein the transmit antenna is a phased array antenna.

11. The apparatus as in claim 1, wherein system on a chip further comprises the digital signal processor and the wireless networking interface.

12. The apparatus as in claim 1, wherein the first radio frequency signal lies between 17.7 GHz and 21.2 GHz, and wherein the second radio frequency signal lies between 27.5 GHz and 31.0 GHz.

13. An apparatus configured as a satellite communications outdoor unit, the apparatus comprising:

a receive antenna to receive a first radio frequency signal from a satellite, wherein the receive antenna is a first phased array antenna capable of pointing to the satellite;

a transmit antenna to transmit a second radio frequency signal to the satellite, wherein the transmit antenna is a second phased array antenna capable of pointing to the satellite;

a system on a chip comprising:
    a satellite communications receiver to down-convert the first radio frequency signal from the receive antenna to a baseband receive signal in one down-conversion operation, the satellite communications receiver comprising:
        a demodulator;
        a first frequency synthesizer producing a first input signal to the demodulator at a first frequency at or near the first radio frequency signal from the satellite; and
        an analog-to-digital converter to produce a first digital representation of the baseband receive signal; and
    a satellite communications transmitter to generate the second radio frequency signal to the transmit antenna by up-converting a processed transmit signal to the second radio frequency signal in one up-conversion operation, the satellite communications transmitter comprising:
        a modulator;
        a second frequency synthesizer producing a second input signal to the modulator at a second frequency at or near the second radio frequency signal; and
        a digital-to-analog converter to produce a voltage from a second digital representation of a baseband transmit signal, wherein the processed transmit signal is produced by filtering, by a low-pass filter, and amplifying, by a variable gain amplifier, the voltage before being up-converted by the modulator to the second radio frequency signal;

a global positioning system receiver to determine a world position of the apparatus, wherein the global positioning system receiver occasionally updates the world position of the apparatus;

a digital signal processor to process the first digital representation of the baseband receive signal to determine received information, and to process transmit information to determine the second digital representation of the baseband transmit signal to the satellite communications transmitter, wherein the digital signal processor causes the first phased array antenna and the second phased array antenna to point to the satellite based on the world position of the apparatus determined by the global positioning receiver and a fixed or predictable position of the satellite; and a wireless networking interface to directly send the received information to a data sink, and to directly receive the transmit information from a data source.

14. The apparatus as in claim 13, wherein the first phased array antenna and the second phased array antenna are one phased array antenna.

15. The apparatus as in claim 13, wherein the wireless networking interface is configured to comply with one or more wireless networking standards.

* * * * *